United States Patent
Brunhuber et al.

(10) Patent No.: US 9,534,508 B2
(45) Date of Patent: Jan. 3, 2017

(54) ENERGY STORAGE POWER PLANT AND METHOD FOR OPERATING SUCH A POWER PLANT

(71) Applicant: Siemens Aktiengesellschaft, Munich (DE)

(72) Inventors: Christian Brunhuber, Auerbach (DE); Carsten Graeber, Erlangen (DE); Gerhard Zimmermann, Hochstadt/Aisch (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 199 days.

(21) Appl. No.: 14/382,315

(22) PCT Filed: Mar. 12, 2013

(86) PCT No.: PCT/EP2013/055027
§ 371 (c)(1),
(2) Date: Aug. 31, 2014

(87) PCT Pub. No.: WO2013/135718
PCT Pub. Date: Sep. 19, 2013

(65) Prior Publication Data
US 2015/0027122 A1 Jan. 29, 2015

(30) Foreign Application Priority Data
Mar. 15, 2012 (DE) .......... 10 2012 204 081

(51) Int. Cl.
*F01K 1/00* (2006.01)
*F01K 3/12* (2006.01)
(Continued)

(52) U.S. Cl.
CPC . *F01K 3/12* (2013.01); *F01K 7/16* (2013.01); *F01K 7/22* (2013.01); *F01K 23/10* (2013.01);
(Continued)

(58) Field of Classification Search
CPC .............. F01K 23/10; F01K 3/12; F01K 7/16; F01K 7/22; F22B 1/028; F22B 1/28; F22G 1/165; F28D 17/04; F28D 20/02
See application file for complete search history.

(56) References Cited

U.S. PATENT DOCUMENTS

| 7,723,858 B2 | 5/2010 | Nayef |
| 2011/0083443 A1 | 4/2011 | Koenig |

(Continued)

FOREIGN PATENT DOCUMENTS

| DE | 2110911 A1 | 9/1972 |
| EP | 1577549 A1 | 9/2005 |

(Continued)

*Primary Examiner* — Jesse Bogue
(74) *Attorney, Agent, or Firm* — Beusse Wolter Sanks & Maire

(57) ABSTRACT

An energy storage power plant for harvesting electric energy, and suitable for converting electric energy into thermal energy is provided. The thermal energy can be temporarily stored in at least two thermal stores until demanded and retrieved to increase the energy content of water in a water circuit upon demand. The power plant has the at least two thermal stores, each has at least one converting device that allows electric energy to be directly or indirectly converted into thermal energy, the thermal stores being thermally chargeable by temporarily storing thermal energy, wherein one thermal store is for storing sensible heat and one thermal store is for storing latent heat; and at least one energy generating unit operated using the water in the water circuit, the energy content of the water having been increased by the temporary storage of thermal energy, in order to generate electric energy when operated.

17 Claims, 2 Drawing Sheets

(51) Int. Cl.
*F01K 7/22* (2006.01)
*F01K 23/10* (2006.01)
*F22B 1/02* (2006.01)
*F22B 1/28* (2006.01)
*F22G 1/16* (2006.01)
*F01K 7/16* (2006.01)
*F28D 17/04* (2006.01)
*F28D 20/02* (2006.01)

(52) U.S. Cl.
CPC ............... *F22B 1/028* (2013.01); *F22B 1/28* (2013.01); *F22G 1/165* (2013.01); *F28D 17/04* (2013.01); *F28D 20/02* (2013.01)

(56) References Cited

U.S. PATENT DOCUMENTS

| | | | | |
|---|---|---|---|---|
| 2011/0100611 A1* | 5/2011 | Ohler | ............... | F01K 3/00 165/104.28 |
| 2011/0219771 A1 | 9/2011 | Stiesdal | | |
| 2012/0067047 A1* | 3/2012 | Peterson | ............... | C02F 1/22 60/651 |
| 2012/0080168 A1* | 4/2012 | Hemrle | ............... | F01K 3/12 165/104.19 |
| 2012/0216520 A1* | 8/2012 | Chen et al. | ............... | F03G 7/06 60/412 |
| 2012/0279679 A1* | 11/2012 | Soukhojak | ............... | B60H 1/00492 165/10 |
| 2013/0068215 A1* | 3/2013 | Neuhauser | ............... | F28D 15/0266 126/400 |
| 2015/0027122 A1 | 1/2015 | Brunhuber et al. | | |

FOREIGN PATENT DOCUMENTS

| | | |
|---|---|---|
| EP | 2020728 A1 | 2/2009 |
| EP | 2101051 A1 | 9/2009 |
| EP | 2369288 A1 | 9/2011 |
| GB | 1196336 A | 6/1970 |
| WO | 2006007733 A1 | 1/2006 |
| WO | 2007134466 A1 | 11/2007 |
| WO | 2012136201 A2 | 10/2012 |
| WO | 2013014178 A1 | 1/2013 |
| WO | 2013135718 A1 | 9/2013 |

* cited by examiner

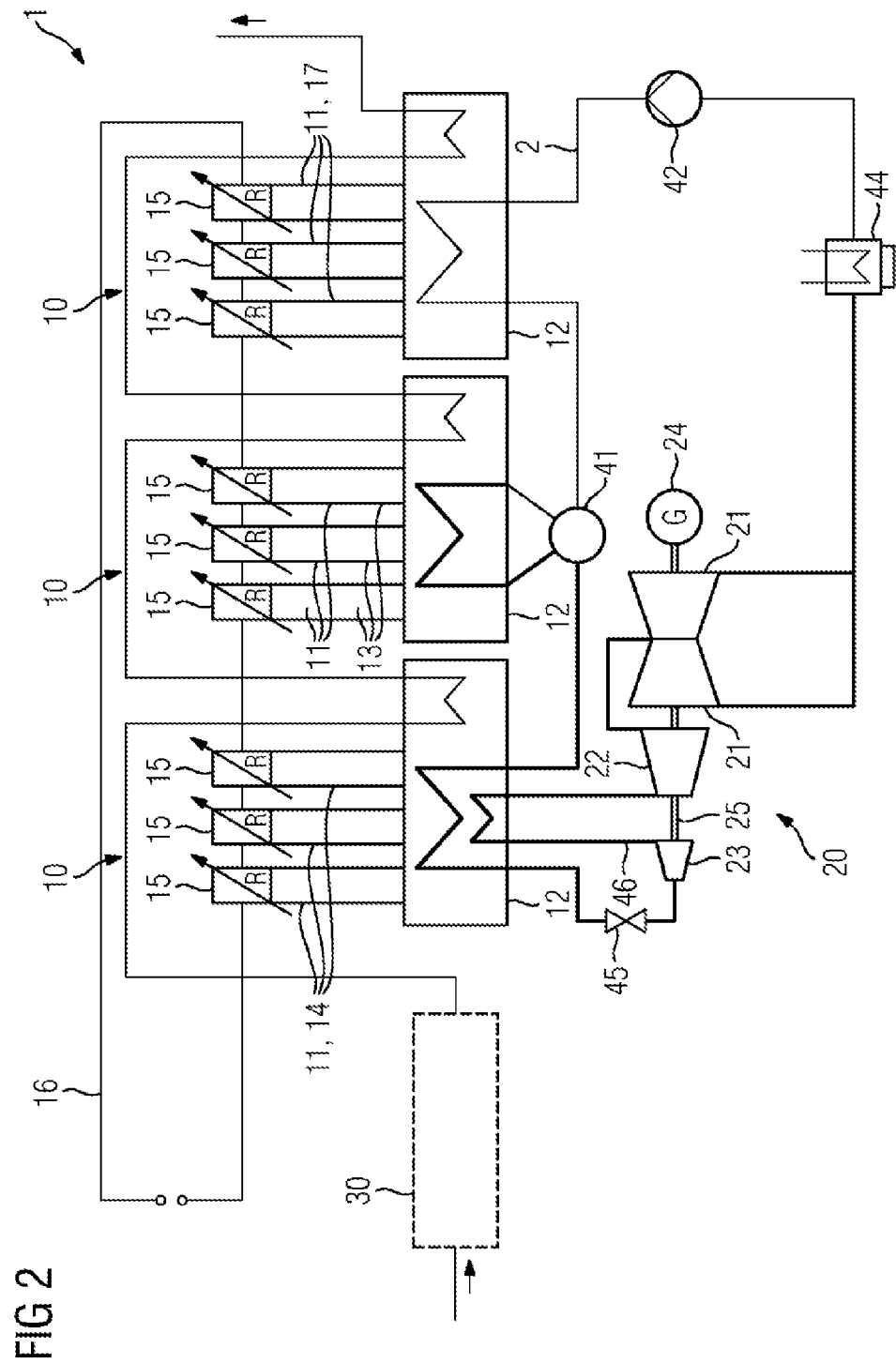

ENERGY STORAGE POWER PLANT AND METHOD FOR OPERATING SUCH A POWER PLANT

CROSS REFERENCE TO RELATED APPLICATIONS

This application is the US National Stage of International Application No. PCT/EP2013/055027 filed Mar. 12, 2013, and claims the benefit thereof. The International Application claims the benefit of German Application No. DE 102012204081.1 filed Mar. 15, 2012. All of the applications are incorporated by reference herein in their entirety.

FIELD OF INVENTION

The present invention relates to an energy power plant for utilizing thermal energy to generate electric power, which is also suitable for converting electrical energy into thermal energy. The present invention furthermore relates to a method for operating such an energy storage power plant.

BACKGROUND OF INVENTION

Energy storage power plants serve primarily to meet the demand for peak loads of electrical energy at periods of high consumption. Moreover, energy storage power plants are essential for providing balancing power to regulate power grids.

In this case, electrical energy is stored in periods of low consumption of electrical energy and output, after a certain delay, when the demand for power is high. For technical reasons, conventional power plants are usually not capable of reacting sufficiently quickly to fluctuations in consumption in the electricity power grid, or of supplying large amounts of power for a short period. In order to be able to accommodate such fluctuations in consumption, energy storage power plants are employed which are also capable of delivering large amounts of electrical power for a relatively short period of time.

Energy storage power plants known from the prior art are differentiated primarily by the manner in which the electrical energy is temporarily stored. The best known type of energy storage power plants are water storage power plants and pumped storage power plants which, at periods of low consumption, pump water into a reservoir where its level relative to the earth's surface gives the water contained therein increased potential energy. Other types of energy storage power plants do not store the electrical energy occurring as potential energy but instead as chemical or physical energy, for example in the form of heat or compressed air.

Many of these types of energy storage power plants are subject to geological or structural constraints so that where they are provided is often dependent on location. In addition, these technologies sometimes also entail high implementation costs which often undermine profitability. A further disadvantage of the energy storage power plants known from the prior art can be seen in the fact that the power output is often too low or cannot be output for sufficiently long periods of time.

SUMMARY OF INVENTION

It is therefore necessary to propose an energy storage power plant which is capable of overcoming the disadvantages known from the prior art.

It is in particular necessary to propose an energy storage power plant which is subject to relatively few constraints with respect to the local area in which it is sited. Such an energy storage power plant should furthermore also be capable of supplying sufficient quantities of electrical power during periods of peak loads which can even last several hours. This should moreover be possible at relatively low cost. It is furthermore desirable to propose an energy storage power plant which is suitable for treating water advantageously and cost-effectively in a steam process by means of thermal energy and thus utilizing it to generate power in an electricity generating process.

These objects of the present invention are achieved by an energy storage power plant and by a method for operating such an energy storage power plant as claimed.

An object of the invention is in particular achieved by an energy storage power plant for generating electrical power which is suitable for converting electrical energy into thermal energy, wherein the thermal energy can be stored temporarily in at least two thermal storage tanks until it is needed and be retrieved when needed in order to increase the energy content of water in a water circuit, comprising:—the at least two thermal storage tanks, each with at least one converting device which enables electrical energy to be converted directly or indirectly into thermal energy, wherein the at least two thermal storage tanks can be thermally charged by temporarily storing this thermal energy, and wherein a thermal storage tank is provided for storing sensible heat and a thermal storage tank is provided for storing latent heat, and—at least one power generation unit which can be operated with the water in the water circuit, the energy content of which was increased by the temporarily stored thermal energy, in order to generate electrical power during operation.

Moreover, an object of the invention is achieved by a method for operating such an energy storage power plant, wherein it has the following steps:—operating the converting device in order to convert electrical energy directly or indirectly into thermal energy, at least one of the at least two thermal storage tanks being thermally charged by temporarily storing this thermal energy;—operating the at least one power generation unit with the aid of the water in the water circuit, the energy content of which was increased by the temporarily stored thermal energy from the at least one thermal storage tank, in order to generate electrical power during operation; wherein a thermal storage tank is in particular charged and/or discharged in a temperature-controlled fashion.

The invention makes use of the fact that electrical energy which can be purchased relatively cheaply at times of excess production of electrical energy can be converted into thermal energy which is temporarily stored in a suitable fashion in the energy storage power plant, and can be supplied again for electricity generation when needed. Electrical energy can hereby be converted into thermal energy using known means and methods. The thermal energy thus generated can be temporarily stored in a controlled fashion in the energy storage power plant until there is a further demand for energy. The thermal energy can then be transmitted efficiently to the water in the water circuit with a low loss of thermal power. A low loss of thermal power is achieved, on the one hand, by virtue of the integration of the thermal storage tank into the power plant and the consequently relatively short supply paths and, on the other hand, by the well-controlled transmission of heat to water in a water circuit.

Providing two different thermal storage tanks additionally enables water to be processed efficiently in a steam process. Providing a thermal storage tank for storing sensible heat and a thermal storage tank for storing latent heat is particularly suitable for particularly efficient stepwise processing of the water as different quantities of thermal energy can be transmitted to the water at different temperature levels. The thermal storage tank for storing latent heat is hereby designed to output thermal energy at an essentially constant temperature level. This is, for example, particularly suitable for evaporating a thermal fluid. The thermal storage tank for storing sensible heat is, on the other hand, particularly suitable for outputting thermal energy in a predetermined temperature range between an upper and a lower temperature threshold value. This is, for example, particularly suitable for superheating a thermal fluid.

Energy storage tanks for holding and outputting latent energy on the basis of liquefied salts or PCM (phase change materials) should hereby be preferably mentioned. Such materials enable thermal energy to be stored at relatively high temperature levels ($\geq 100°$ C.). Such materials are particularly suitable for providing a thermal storage tank which is used to superheat already generated steam in the water circuit, as they can also be used at temperatures above 400° C. without decomposition.

Thermal storage tanks for temporarily storing sensible heat can also be provided on the basis of cost-effective materials such as, for example, concrete, rock, or sand. Similarly, thermal oils are also suitable for use in thermal storage tanks for storing sensible heat. Thermal oils are particularly suitable for temperature levels below 300° C.

Transmitting the thermal energy to the water in the water circuit typically serves to preheat the water or to cause it to evaporate under predetermined conditions. It is likewise conceivable that the temporarily stored thermal energy serves to process the steam, in particular to superheat it. Accordingly, the thermal energy from the storage tank can be used to suitably condition the water in the water circuit under different process requirements. It is particularly advantageous if the water is evaporated by means of heat which is removed from the thermal storage tank which is provided for temporarily storing latent heat. It is likewise advantageous that heat from the thermal storage tank for storing sensible heat is used to superheat already generated steam.

The method for operating an energy storage power plant is advantageously carried out in a temperature-controlled fashion.

By controlling the temperature, on the one hand, the charging state in the thermal storage tank can be suitably modified and, on the other hand, it is possible to achieve an advantageous degree of control over the discharging state during temperature-controlled removal of the thermal energy. Moreover, the thermal energy still available in the thermal storage tank can be estimated with the aid of the prevailing temperature conditions therein, as a result of which the maximum possible quantities of thermal energy removed can be calculated easily.

According to a first embodiment of the energy storage power plant according to the invention, it is provided that at least one, and preferably two, thermal storage tanks has/have a modular structure, wherein the respective modules can be charged as necessary with thermal energy independently of each other and/or be discharged as necessary independently of each other in order to transmit thermal energy to the water in the water circuit. By virtue of the modular structure of a thermal storage tank, the amount of energy to be stored can be controlled or regulated variably so that a greater degree of control over the process of discharging thermal energy to the water in the water circuit can be achieved. Moreover, it is also possible to charge modules of the thermal storage tank with differently sized quantities of thermal energy but without there being a need to remain below any predetermined minimum temperatures. Similarly, the charging process can take place in such a way that the temperature level of a module of the thermal storage tank reaches a predetermined target temperature. Furthermore, the modular structure also makes it possible for differently sized quantities of thermal energy to be able to be output or held at essentially a constant temperature level.

It is, for example, also advantageous to adjust technically predetermined target temperatures during the preheating of the water in the water circuit or during the evaporation or superheating of the steam from the water in the water circuit in order thus to effect efficient use of all thermal sources. It needs to be taken into consideration, in particular in the case of reconversion into electricity by means of a steam turbine, that different reconversion outputs require differing flows of quantities of steam, which is why in these cases different thermal outputs also need to be called up from the thermal storage tank. In this connection, the modular structure of the thermal storage tank enables the operation of a steam cycle which is stable with respect to its fluid dynamic behavior, as a result of which the steam conditions required for the reconversion into electricity can be readily controlled.

According to a further embodiment of the energy storage power plant according to the invention, it is provided that at least one, and preferably both thermal storage tanks transmits/transmit its/their thermal energy to the water in the water circuit indirectly via one or more heat exchangers. Although the heat exchanger does, on the one hand, cause a slight reduction in the efficiency of the heat transmission, it does represent an improvement in process technology terms because the heat can be transmitted via it from the thermal storage tank to the water in the water circuit in a controlled manner. In addition, it is possible to supply the heat exchanger via individual modules of the thermal storage tank in a targeted fashion. Accordingly, the temperature level of the heat exchanger or the change over time in the temperature level of the heat exchanger can in particular be adjusted in a suitable manner by individual modules outputting their heat to the heat exchanger at different times or at a different temperature level. A heat exchanger with multiple modules which can transmit different quantities of thermal energy to the heat exchanger at different times is preferred. The heat exchanger can hereby in the simplest case take the form of a heat storage device for temporary thermal storage of the thermal energy transmitted from the individual modules.

According to a development of the above described embodiment, it is provided that the heat exchanger can likewise also be supplied with thermal energy from another heat source. Such a heat source is in particular an external heat source, the thermal energy of which comes from a combustion process, particularly preferably from a power plant process. The waste heat of a gas turbine can particularly preferably hereby be transmitted to the heat exchanger. The heat exchanger can, for example, also be comprised of a steam power plant or a coupled gas and steam power plant.

According to a further embodiment of the energy storage power plant according to the invention, it is also provided that the at least one thermal storage tank directly outputs its thermal energy to the water in the water circuit, wherein the water circuit extends at least partially within the thermal storage tank. When thermal energy is output directly to the water in the water circuit, it must be expected that the efficiency of the thermal transmission is relatively high. In addition, a thermal coupling of the water circuit to the thermal storage tank can sometimes be achieved by relatively simple structural measures.

According to a further embodiment of the present invention, it is provided that the converting device is an electrical resistance heating device. The resistance heating device allows electrical energy to be converted into thermal energy with relatively high efficiency. Suitable electrical resistors thus make it possible to convert almost all the electrical energy into thermal heat which can be temporarily stored in the thermal storage tank. The arrangement of the electrical resistance heating device relative to the thermal storage tank is preferably carried out in such a way that there is only a relatively low thermal transmission resistance when the thermal energy is transmitted to the thermal storage tank. If the thermal storage tank has, for example, a modular structure, it is also possible to control individual modules differently in order thus to transmit a different respective thermal output into the individual modules. It is moreover also preferred that each of the individual modules of the thermal storage tank is provided with at least one converting device for converting electrical energy into thermal energy.

According to a further aspect of the present invention, the at least two thermal storage tanks provided in the energy storage power plant are designed in such a way that thermal energy is output at two different temperature levels, wherein thermal energy is in particular transmitted to the water in the water circuit at two different points in the water circuit. A high degree of control and thermal efficiency of the transmission of thermal energy to the water in the water circuit is thus ensured. When at least one of the two thermal storage tanks is provided for evaporating the water in the water circuit, a stable steam cycle can additionally thus also be generated which is necessary for use in a steam process. Moreover, different quantities of thermal energy can be transmitted to the water circuit at different points in the water circuit, as a result of which a higher thermal overall efficiency can also result.

According to another embodiment, the thermal storage tank for storing sensible heat has a higher temperature level and serves to provide thermal energy for superheating already generated steam from the water in the water circuit. The thermal storage tank for storing the latent heat can, by comparison, have a lower temperature level and can be used to provide thermal energy in an evaporator which transforms water in the water circuit into its steam phase.

According to a further aspect of the described embodiments of the energy storage power plant, it can be provided that one of the at least two thermal storage tanks has a temperature level of less than 400° C. and one of the at least two thermal storage tanks has a temperature level of more than 400° C. These temperature levels are in particular suitable for transmitting thermal energy to water in a water circuit in conjunction with a steam process. At a temperature level of less than 400° C., the water situated in the water circuit can thus, for example, be evaporated by a sufficient transmission of thermal energy, wherein the steam is subsequently superheated at a temperature level of more than 400° C. by further transmission of thermal energy from the second thermal storage tank. The temperature levels according to the embodiment are thus particularly suitable for use in an energy storage power plant which achieves the generation of electrical power by means of a steam turbine.

According to a further exemplary embodiment, the energy storage power plant can be designed in such a way that the power generation unit has at least one steam turbine, preferably at least two steam turbines supplied by the water circuit, wherein the water circuit is arranged downstream with respect to the first steam turbine in order to receive further heat with at least one thermal storage tank for thermal conversion. In this way, the steam issuing from a high-pressure steam turbine can, for example, be superheated again in order then to feed it to a medium-pressure steam turbine. The repeated superheating ensures improved efficiency in the generation of electrical power.

According to further embodiments, it is likewise possible to condition the water in the water circuit during its travel between the individual steam turbines in a targeted way by the transmission of thermal energy from one of the thermal storage tanks. It is thus, for example, conceivable that the steam issuing from a medium-pressure steam turbine is conditioned again in a further thermal conditioning by transmitting thermal heat from the thermal storage tank before it is fed into a low-pressure steam turbine. In this embodiment too, the overall efficiency of the power generation unit can be increased.

According to another embodiment of the energy storage power plant, at least one of the thermal storage tanks, in particular the storage tank provided to store latent heat, is designed to evaporate water in the water circuit. The evaporation can, for example, take place in a pipe fluidly connected to an evaporation vessel.

According to a further embodiment, at least one of the thermal storage tanks, in particular the storage tank provided to store sensible heat, is designed to superheat water that is at least partially in the form of steam in the water circuit.

It is furthermore also possible that the thermal storage tank that is provided to store sensible heat is designed to be charged or discharged at an essentially constant temperature level. During the discharging, this can preferably be achieved by providing two reservoirs in the thermal storage tank with a liquid heat storage medium, wherein the heat storage medium in each reservoir is at different temperature levels. By mixing the thermal energy from both reservoirs in a targeted way, an essentially uniform temperature level can subsequently be ensured during the discharging of the thermal storage tank (two tank solution).

According to an embodiment of the method according to the invention, it is provided that at least one thermal storage tank is charged by means of excess electricity from the public electricity grid. Accordingly, excess electricity can be removed at times when the price of electricity is relatively favorable. This electrical energy is converted into thermal energy and temporarily stored in the thermal storage tank until there is a need to meet an increased requirement in the electricity grid on the basis of increased demand. This can be met at different times with the aid of thermal energy, removed from the thermal storage tank, which is converted into electrical energy by means of the power generation unit. Because the electrical energy generated at this point in time can be purchased at a higher price, advantageous profitability results for the operator of the energy storage power plant.

According to another embodiment of the method according to the invention for operating an energy storage power plant, it is provided that the modules of at least one of the thermal storage tanks are charged at different times or are discharged at different times in order to transmit thermal energy to the water in the water circuit. As already described above, on the one hand the efficiency of the thermal heat transmission to the water in the water circuit can thus be increased and the control of the whole method for reconversion into electricity improved.

Other embodiments can be derived from the subclaims.

BRIEF DESCRIPTION OF THE DRAWINGS

The following drawings explain the invention with the aid of concrete exemplary embodiments. The form that the invention takes in the drawings does not represent any limitation with respect to the general nature of the claimed invention. In the drawings, FIG. 2 shows a second embodiment of the energy storage power plant according to the invention in a schematic representation.

DETAILED DESCRIPTION OF INVENTION

Figure 1:
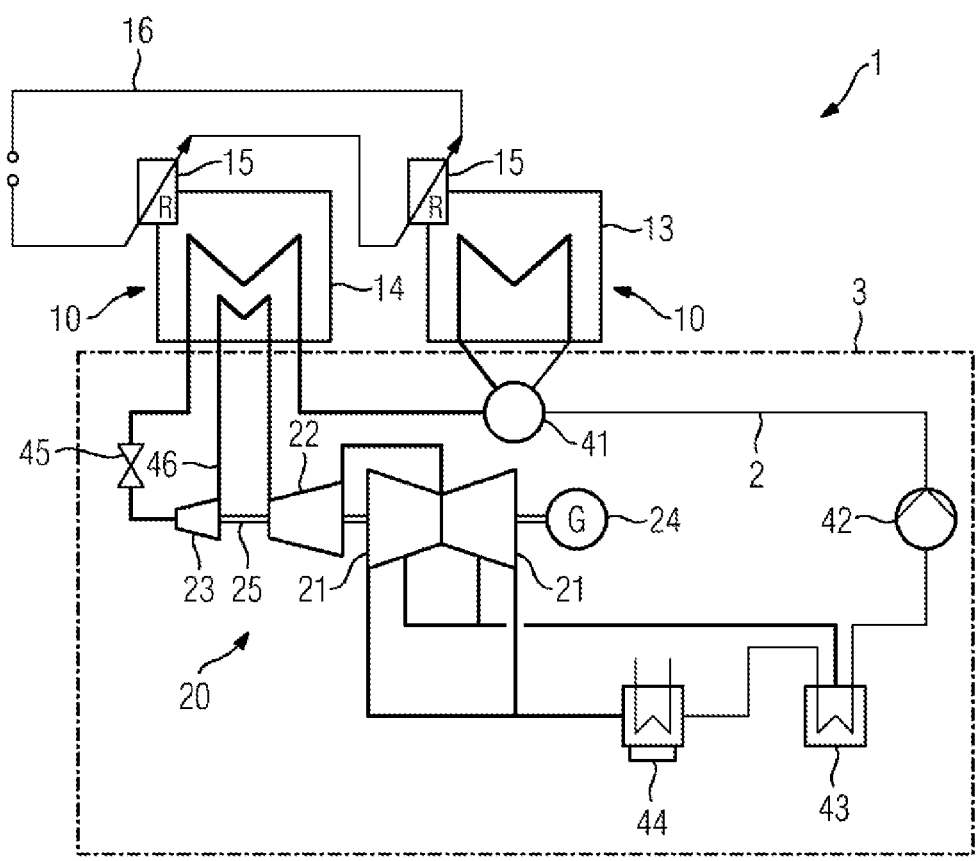
FIG. 1 shows a first embodiment of the energy storage power plant according to the invention in a schematic representation.

FIG. 1 shows a first embodiment of the energy storage power plant 1 according to the invention for generating electricity. Inside a power plant unit 3, the energy storage power plant 1 has a power generation unit 20 which is provided for generating electrical energy. The power generation unit 20 comprises a low-pressure turbine (LP turbine) 21 which is axially coupled to a medium-pressure turbine (MP turbine 22) which in turn is axially coupled to a high-pressure turbine (HP turbine) 23. All three turbines have a common shaft 25 by means of which they are operatively connected to a generator 24 in order to generate electricity. The power generation unit 20 is supplied with superheated steam from the water circuit 2. In order to generate the superheated steam, water in the water circuit 2 is initially evaporated by transferring thermal energy from one of the two thermal storage tanks 10 and the steam generated in this way is superheated in a subsequent step.

In order to evaporate the water in the water circuit 2, it can be allowed to flow into a water reservoir 41 from which in turn part of the water is removed and at least partially evaporated by transferring thermal energy from the thermal storage tank 10 which is used as an evaporator 13. The steam generated in this way, or the steam/water mixture generated is fed back into the water reservoir 41 from which the steam generated is removed in a subsequent step for superheating. By transferring thermal energy from a further thermal storage tank 10 which is used as a superheater 14, this steam is superheated by the input of additional energy and then fed to the power generation unit 20. As shown, valves for controlling the steam mass flow can hereby be provided.

If part of the energy of the superheated steam in the water circuit 2 is output to the high-pressure turbine 23 of the power generation unit 20, it is fed to the superheater 14 (thermal storage tank 10) with the aid of a reheater pipe 46 in order to transfer further thermal energy from said superheater 14. This reheated steam is then fed to the medium-pressure turbine 22 and downstream to the low-pressure turbine 21. The kinetic energy stored in the steam is converted by the three turbines 21, 22 and 23 into rotation of the shaft 25, by means of which the generator 24 is in turn operated in order to generate electricity.

Downstream from the low-pressure turbine 21, the remaining steam is fed to a condenser 44 in which the water is cooled to such a low temperature level that it passes into its liquid phase. The liquid water generated in the condenser 44 is then fed to a preheater 43 for heating again, said preheater 43 being partially supplied with steam from the low-pressure turbine 21. The water leaving the preheater 43, provided with an increased energy content, is then fed again to the evaporator 13 by the condensate pump 42.

According to the embodiment shown in FIG. 1, the thermal storage tank 10, which is designed as an evaporator 13, is at a lower temperature than the thermal storage tank 10 which is designed as a superheater 14. Accordingly, it is advisable to design the evaporator 13 as a thermal storage tank for storing latent heat, whereas the superheater 14, which needs to have considerably higher temperatures, is designed as a thermal storage tank for storing sensible heat.

In order to charge both thermal storage tanks 10, when necessary electrical energy is removed from an electrical supply circuit 16, i.e. from the public electricity grid, and then converted into thermal energy by means of one or more suitable converting devices 15. In the present case, the two thermal storage tanks 10 are each provided with a converting device 15 which is designed as a resistance heating device. Accordingly, it is possible when necessary to remove electrical energy from the electric supply circuit 16 and to store it temporarily as thermal energy in one of the two thermal storage tanks 10. Depending on the amount of energy required and depending on the necessary temperature level, the converting devices 15 can be adjusted individually in order to correspond to the process-related requirements. This adjustment can be performed in numerous embodiments of the invention.

FIG. 2 shows a further embodiment of the energy storage power plant according to the invention in a schematic representation. With respect to the power generation unit 20, the embodiment shown in FIG. 2 does not differ significantly from the embodiment shown in FIG. 1.

An essential difference between the two embodiments is, however, that the embodiment shown in FIG. 2 has thermal storage tanks 10 with a modular structure which are each thermally connected to a heat exchanger 12. In all, three thermal storage tanks 10 are provided which are each constructed from three modules 11. The individual modules 11 each have a converting device 15 which enables electrical energy from an electrical supply circuit 16 to be converted into thermal energy. The thermal energy generated in this way is temporarily stored in the respective associated module 11 of the thermal energy storage power plant 10. Depending on demand, thermal power can be removed from these modules 11 of the thermal storage tank 10 and transferred to the heat exchanger 12. According to an embodiment, the respective transfer can also be controlled or regulated in a suitable fashion.

As in the embodiment according to FIG. 1, the embodiment according to FIG. 2 also has a thermal storage tank 10 which is designed as an evaporator 13, and a thermal storage tank 10 which is designed as a superheater 14. In addition, the embodiment shown also has a further thermal storage tank 10 which is designed as an economizer 17 and serves to preheat the water in the water circuit 2 before it is transferred into the water reservoir 41 and then into the associated heat exchanger 12 in order to transmit thermal energy. According to an embodiment, the thermal storage tank 10 which is designed as an economizer 17 has a lower temperature level than the thermal storage tank 10 which is designed as an evaporator 13. By virtue of the thermal storage tank 10, which is additional in comparison with the embodiment in FIG. 1 and is designed as an economizer 17, improved control of the thermal transfer, and also improved control of the fluid dynamic flow conditions in the water circuit 2, can be achieved.

Furthermore, the embodiment according to FIG. 2 differs from that shown in FIG. 1 in that the thermal storage tank 10 can be additionally also supplied with thermal energy by an external heat source 30. The heat source 30 hereby preferably makes available thermal energy from a combustion process, particularly preferably waste heat from a combustion process. Depending on demand, this heat can be transferred into the heat exchanger 12 in order thus to increase the amount of thermal energy which is transmitted to the water in the water circuit 2. As shown, the thermal energy can be transmitted in series in from the heat source 30 to the individual heat exchangers 12 one after the other through a connecting pipe. However, alternatively transmission in parallel from the heat source 30 or an individual solution are also conceivable. It is known to a person skilled in the art that such an external heat source 30 could also in principle be provided in the embodiment according to FIG. 1.

The invention claimed is:

1. An energy storage power plant for generating electrical power which is suitable for converting electrical energy into thermal energy, wherein the thermal energy can be stored temporarily in at least two thermal storage tanks until it is needed and be retrieved when needed in order to increase an energy content of water in a water circuit, comprising:
at least two thermal storage tanks, each with at least one converting device which enables the electrical energy to be converted into the thermal energy,
wherein the at least two thermal storage tanks can be thermally charged by temporarily storing the thermal energy, and
wherein a thermal storage tank of the at least two thermal storage tanks is for storing sensible heat and a thermal storage tank of the at least two thermal storage tanks is for storing latent heat, and
wherein at least one of the at least two thermal storage tanks has a modular structure comprising modules to charge the at least one of the at least two thermal storage tanks, wherein the at least one of the at least two thermal storage tanks is thermally connected to a heat exchanger, and wherein via the heat exchanger heat can be transmitted from the modules of the at least one of the at least two thermal storage tanks to the water in the water circuit,
wherein each of the modules is provided with a respective converting device for converting the electrical energy into the thermal energy, thereby enabling each module to be charged independent of whether other modules are charging, and
at least one power generation unit configured to be operated with the water in the water circuit in order to generate electrical power during operation.

2. The energy storage power plant as claimed in claim 1, wherein
wherein each of the modules can be discharged independent of whether other modules are discharging.

3. The energy storage power plant as claimed in claim 1, wherein each converting device is an electric resistance heating device.

4. The energy storage power plant as claimed in claim 1, wherein one of the at least two thermal storage tanks is configured to operate at a temperature level of less than 400° C and one of the at least two thermal storage tanks is configured to operate at a temperature level of more than 400° C.

5. The energy storage power plant as claimed in claim 1, wherein the power generation unit comprises a high pressure steam turbine, a medium pressure steam turbine, and a low pressure steam turbine, each steam turbine being supplied by the water circuit, wherein the high pressure steam turbine is arranged to receive water comprising the heat.

6. The energy storage power plant as claimed in claim 1, wherein at least one of the at least two thermal storage tanks is designed to evaporate water in the water circuit.

7. The energy storage power plant as claimed in claim 1, wherein at least one of the at least two thermal storage tanks is designed to superheat water that is at least partially in the form of steam in the water circuit.

8. The energy storage power plant as claimed in claim 1, wherein the thermal storage tank that is provided to store sensible heat is designed to be charged, discharged, or discharged and discharged at an essentially constant temperature level.

9. A method for operating an energy storage power plant as claimed in claim 1, comprising:
operating the at least one converting device in order to convert the electrical energy into the thermal energy, the at least one of the at least two thermal storage tanks being thermally charged by temporarily storing the thermal energy, wherein the at least one of the at least two thermal storage tanks comprises the modular structure comprising the modules to charge the at least one of the thermal storage tanks, wherein the at least one of the at least two storage tanks is thermally connected to the heat exchanger, and wherein each of the modules of the at least one of the at least two thermal storage tanks is provided with the respective converting device for converting the electrical energy into the thermal energy, thereby enabling each module to be charged independent of whether other modules are charging;
transmitting the heat via the heat exchanger from the modules to the water in the water circuit;
operating the at least one power generation unit using the water in the water circuit, the energy content of which was increased by the heat in order to generate the electrical power during operation;
wherein each of the at least two thermal storage tanks is charged, discharged, or charged and discharged in a temperature-controlled fashion.

10. The method as claimed in claim 9, further comprising receiving the electrical energy used to charge the at least one thermal storage tank from a public electricity grid.

11. A method for operating an energy storage power plant as claimed in claim 2,
further comprising charging or discharging one module at a different time than another module.

12. The energy storage power plant as claimed in claim 1, wherein
each of the at least two thermal storage tanks comprises a modular structure comprising respective modules that are charged to charge a respective thermal storage tank, wherein the respective modules are chargeable independent of whether other modules are charging and dischargeable independent of whether other modules are discharging.

13. The energy storage power plant as claimed in claim 1, wherein the power generation unit comprises at least two steam turbines each being supplied by the water circuit.

14. The energy storage power plant as claimed in claim 1, wherein the storage tank provided to store latent heat is designed to evaporate water in the water circuit.

15. The energy storage power plant as claimed in claim 1, wherein the storage tank provided to store sensible heat is designed to superheat water that is at least partially in the form of steam in the water circuit.

16. The energy storage power plant as claimed in claim 1, wherein the modules are independently chargeable with differently sized quantities of thermal energy.

17. The energy storage power plant as claimed in claim 1, wherein the modules are independently dischargeable with differently sized quantities of thermal energy.

* * * * *